United States Patent
Singh et al.

(10) Patent No.: US 12,287,697 B2
(45) Date of Patent: Apr. 29, 2025

(54) SYSTEM AND METHOD FOR METAVERSE DEBUGGING

(71) Applicant: Bank of America Corporation, Charlotte, NC (US)

(72) Inventors: Shailendra Singh, Thane West (IN); Krithika Viswanathan, Chennai (IN); Amit Mishra, Chennai (IN); Anu Joy, Chennai (IN); Amaresh Gunasekar, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 156 days.

(21) Appl. No.: 18/325,547

(22) Filed: May 30, 2023

(65) Prior Publication Data

US 2024/0403196 A1   Dec. 5, 2024

(51) Int. Cl.
| | |
|---|---|
| *G06F 11/07* | (2006.01) |
| *G06F 11/36* | (2006.01) |
| *G06F 11/3604* | (2025.01) |
| *G06F 11/362* | (2025.01) |

(52) U.S. Cl.
CPC ...... *G06F 11/0706* (2013.01); *G06F 11/0793* (2013.01); *G06F 11/3612* (2013.01); *G06F 11/362* (2013.01); *G06F 11/3664* (2013.01)

(58) Field of Classification Search
CPC .............. G06F 11/36–3696; G06F 11/07–0796
See application file for complete search history.

(56) References Cited

U.S. PATENT DOCUMENTS

| | | |
|---|---|---|
| 8,090,989 B2 | 1/2012 | Law et al. |
| 8,375,386 B2 | 2/2013 | Hende |
| 8,612,937 B2 | 12/2013 | Dudek et al. |
| 9,292,412 B2 | 3/2016 | Mohindra et al. |
| 9,396,093 B1 | 7/2016 | Enakiev et al. |
| 9,436,583 B1 | 9/2016 | Chen et al. |
| 9,588,870 B2 | 3/2017 | Marron et al. |
| 10,127,137 B2 | 11/2018 | Zhang et al. |
| 10,229,033 B2 | 3/2019 | Pechanec et al. |
| 11,010,280 B1 | 5/2021 | Stupachenko et al. |
| 11,030,076 B2 | 6/2021 | Law et al. |
| 11,074,153 B2 | 7/2021 | Nelson et al. |
| 11,113,182 B2 | 9/2021 | Nelson et al. |
| 11,586,286 B1 | 2/2023 | Singh |
| 11,886,227 B1 * | 1/2024 | Gupta ............... G06N 20/00 |
| 2011/0107137 A1 * | 5/2011 | Lam ................ G06F 11/0793 |
| | | 714/E11.023 |

(Continued)

*Primary Examiner* — Todd Aguilera

(57) ABSTRACT

A method includes monitoring an interaction of a user with a metaverse session. A notification is sent to a first developer that the user is facing an issue while interacting with the metaverse session. The first developer is allowed access to the metaverse session at a location of the issue using a first developer avatar. One or more error flags are generated within a field of view of the first developer avatar in the metaverse session. Each error flag includes a respective error code. In response to determining that a first error code of a first error flag matches a first stored error code, a first solution is determined. The first solution includes a first stored solution corresponding to the first stored error code. In response to determining that the first solution solves the issue of the user, the first solution is deployed to the metaverse session.

20 Claims, 4 Drawing Sheets

(56) References Cited

U.S. PATENT DOCUMENTS

| | | |
|---|---|---|
| 2013/0139128 A1 | 5/2013 | Jones et al. |
| 2021/0286701 A1* | 9/2021 | Casella .................. G06T 15/06 |
| 2024/0273005 A1* | 8/2024 | Bussa ................. G06F 11/0793 |
| 2024/0273006 A1* | 8/2024 | Bussa ..................... G06T 17/00 |
| 2024/0273012 A1* | 8/2024 | Bussa ................. G06F 11/3688 |
| 2024/0325919 A1* | 10/2024 | Kestell ................. G06F 16/188 |
| 2024/0338300 A1* | 10/2024 | Arichandrapandian ..................... G06F 11/3656 |

* cited by examiner

SYSTEM AND METHOD FOR METAVERSE DEBUGGING

TECHNICAL FIELD

The present disclosure relates generally to management of a virtual environment, and more specifically to a system and method for metaverse debugging.

BACKGROUND

With growing demand for metaverse applications there is a need to develop a mechanism to make metaverse applications more resilient. Currently, debugging metaverse applications is an offline activity. This conventional approach consumes more processing and networking resources and increases downtime of metaverse sessions.

SUMMARY

The system described in the present disclosure provides several practical applications and technical advantages that overcome the current technical problems with metaverse debugging.

In general, a system for metaverse debugging includes one or more developer devices, a metaverse server, and a monitoring/debugging system communicatively coupled to each other via a network. The metaverse server allows a user access to a metaverse session using a user avatar to receive desired services. The monitoring/debugging system monitors the metaverse session and sends a notification to a developer that the user is facing one or more issues while interacting with the metaverse session. The metaverse server allows the developer access to the metaverse session at a location of the one or more issues using a developer avatar. The monitoring/debugging system generates one or more error flags in the metaverse session within a field of view of the developer avatar based on the one or more issues. Each error flag comprises a respective error code. The developer opens a debugging interface in the metaverse session and selects an error flag of the one or more error flags. The developer requests a solution for an error code of the selected error flag from the monitoring/debugging system. The monitoring/debugging system determines if the error code of the selected error flag matches with an error code stored in a knowledge database of the monitoring/debugging system. In response to determining that the error code of the selected error flag matches with the error code stored in the knowledge database, the monitoring/debugging system determines the solution. The developer determines if the solution solves an issue corresponding to the error code of the selected error flag. In response to determining that the solution solves the issue corresponding to the error code of the selected error flag, the developer deploys the solution. In response to determining that the solution does not solve the issue corresponding to the error code of the selected error flag, the developer edits the solution to obtain the edited solution. The developer determines if the edited solution solves the issue of the selected error flag. In response to determining that the edited solution solves the issue corresponding to the error code of the selected error flag, the developer deploys the edited solution. The monitoring/debugging system saves the edited solutions along with the corresponding error code in the knowledge database. In response to determining that the error code of the selected error flag does not match with the error code stored in the knowledge database or the edited solution does not solve the issue corresponding to the error code of the selected error flag, the developer sends requests to one or more additional developers to join the metaverse session. The developer determines a new solution in collaboration with the one or more additional developers and deploys the new solution. The monitoring/debugging system saves the new solution along with the corresponding error code in the knowledge database. The system repeats the above process for the rest of the error flags.

The system for metaverse debugging allows for debugging live metaverse sessions in response to users' requests. By debugging live metaverse sessions, issues facing the users may be promptly addressed and solutions may be promptly deployed, which in turn improves performance of metaverse sessions. By debugging metaverse sessions during runtime, metaverse sessions are not taken offline, which reduces downtime of metaverse sessions. By not needing extra offline debugging sessions, computing resources (e.g., processing power, memory, and/or network bandwidth) that would be otherwise consumed during the offline debugging sessions are saved and may be used for other desired applications.

Accordingly, the following disclosure is particularly integrated into practical applications of: (1) debugging live metaverse sessions in response to users' requests; (2) improving performance of metaverse sessions by reducing downtime of the metaverse sessions; and (3) saving computing resources (e.g., processing power, memory, and/or network bandwidth) by not using offline debugging sessions.

In one embodiment, a system includes a metaverse server. The metaverse server includes a first processor. The first processor is configured to allow a user access to a metaverse session using a user avatar, where the user faces an issue while interacting with the metaverse session, and allow a first developer access to the metaverse session at a location of the issue using a first developer avatar. The system further includes a monitoring/debugging system communicatively coupled to the metaverse server. The monitoring/debugging system includes a memory and a second processor communicatively coupled to the memory. The memory is configured to store a plurality of stored error codes, and a plurality of stored solutions corresponding to the plurality of stored error codes. The second processor is configured to monitor an interaction of the user with the metaverse session, send a notification to the first developer that the user is facing the issue while interacting with the metaverse session, and generate one or more error flags within a field of view of the first developer avatar in the metaverse session. Each error flag includes a respective error code. The second processor is further configured to compare a first error code of a first error flag to the plurality of stored error codes. In response to determining that the first error code matches a first stored error code, the second processor is further configured to determine a first solution. The first solution includes a first stored solution corresponding to the first stored error code. In response to determining that the first solution solves the issue of the user, the second processor is further configured to deploy the first solution to the metaverse session.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description.

DETAILED DESCRIPTION

As described above, previous technologies fail to provide effective systems and methods for metaverse debugging. Embodiments of the present disclosure and their advantages may be understood by referring to FIGS. 1, 2, 3A, and 3B. FIGS. 1, 2, 3A, and 3B are used to describe a system and method for metaverse debugging.

System Overview

Figure 1:
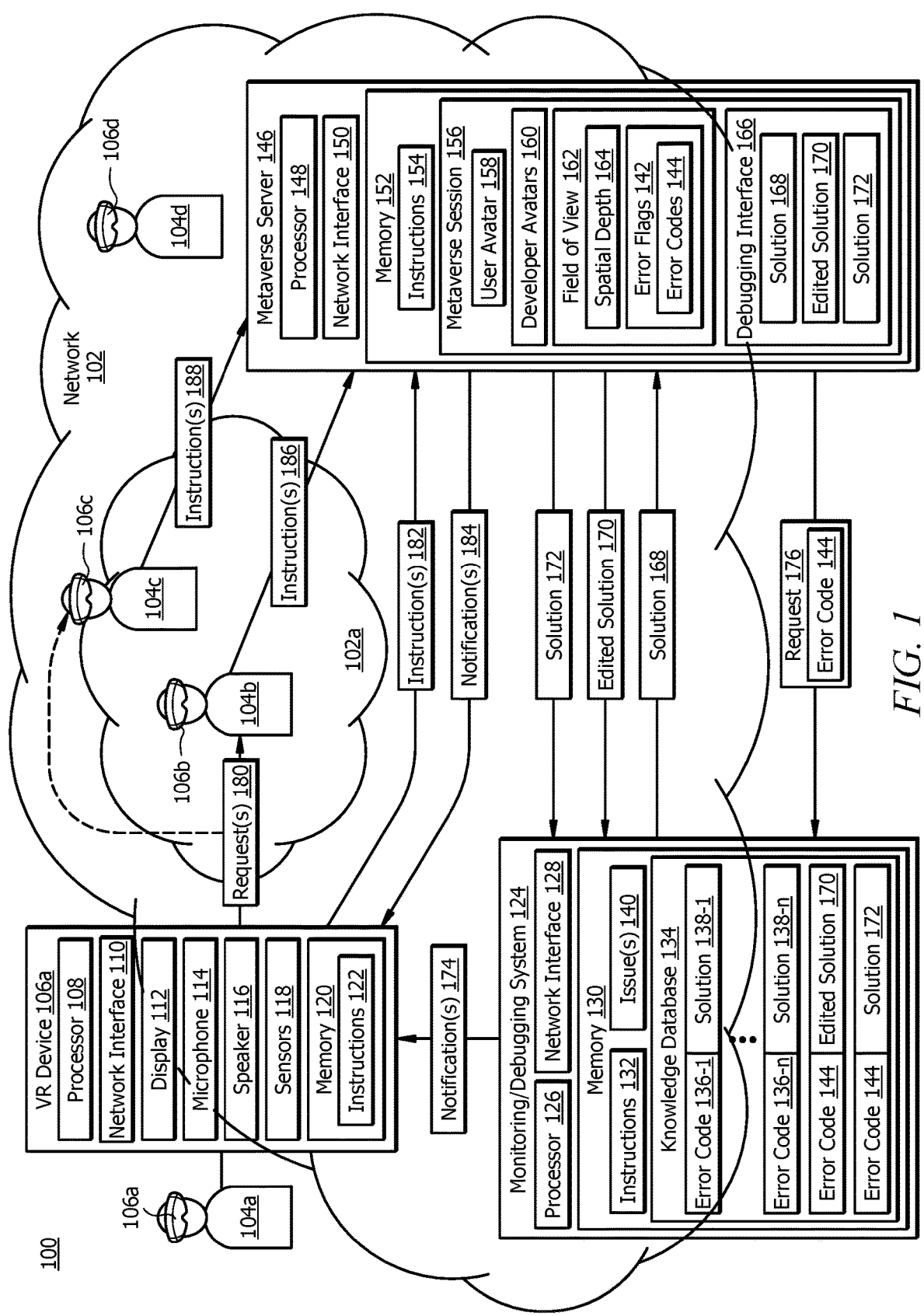
FIG. 1 illustrates an embodiment of a system for metaverse debugging.

FIG. 1 illustrates an embodiment of a system 100 for metaverse debugging. An entity may deploy the system 100 to provide services to one or more users (e.g., user 104d) via a metaverse session 152 hosted by a metaverse server 146. The entity may be an organization, a company, a business, or the like. The system 100 allows one or more developers (e.g., developers 104a through 104c) to debug the metaverse session 156 during runtime in response to receiving a notification that the one or more users (e.g., user 104d) are facing one or more issues 140 while interacting with the metaverse session 156.

In certain embodiments, the system 100 comprises a plurality of user devices 106a through 106d operably coupled to a metaverse server 146, and a monitoring/debugging system 124 via a network 102. Network 102 enables the communication between the components of the system 100. In other embodiments, the system 100 may not have all the components listed and/or may have other elements instead of, or in addition to, those listed above. For example, the monitoring/debugging system 124 may be integrated into the metaverse server 146.

In general, the metaverse server 146 of the system 100 allows a user 104d to access a metaverse session 156 using a user avatar 158 to receive desired services. The monitoring/debugging system 124 monitors the metaverse session 156 and sends a notification 174 to a developer 104a that the user 104d is facing one or more issues 140 while interacting with the metaverse session 156. The metaverse server 146 allows the developer 104a access to the metaverse session 156 at a location of the one or more issues 140 using a developer avatar 160. The monitoring/debugging system 124 generates one or more error flags 142 in the metaverse session 156 within a field of view 162 of the developer avatar 160 based on the one or more issues 140. Each error flag 142 comprises a respective error code 144. The developer 104a opens a debugging interface 166 in the metaverse session 156 and selects an error flag of the one or more error flags 142. The developer 104a requests a solution 168 for an error code (e.g., respective one of error codes 144) of the selected error flag (e.g., respective one of error flags 142) from the monitoring/debugging system 124. The monitoring/debugging system 124 compares the error code (e.g., respective one of error codes 144) of the selected error flag (e.g., respective one of error flags 142) to error codes 136-1 through 136-n stored in a knowledge database 134 of the monitoring/debugging system 124 and determines if the error code (e.g., respective one of error codes 144) of the selected error flag (e.g., respective one of error flags 142) matches an error code (e.g., respective one or error codes 136-1 through 136-n) stored in the knowledge database 134. In response to determining that the error code (e.g., respective one of error codes 144) of the selected error flag (e.g., respective one of error flags 142) matches the error code (e.g., respective one or error codes 136-1 through 136-n) stored in the knowledge database 134, the monitoring/debugging system 124 determines the solution 168 for the error code (e.g., respective one of error codes 144) of the selected error flag (e.g., respective one of error flags 142). In certain embodiments, the monitoring/debugging system 124 determines the solution 168 to be a solution among the solutions 138-1 through 138-n that corresponds to the error code (e.g., respective one or error codes 136-1 through 136-n) stored in the knowledge database 134. The developer 104a tests the solution 168. The developer 104a determines if the solution 168 solves an issue (e.g., respective one of issues 140) corresponding to the error code (e.g., respective one of error codes 144) of the selected error flag (e.g., respective one of error flags 142). In response to determining that the solution 168 solves the issue (e.g., respective one of issues 140) corresponding to the error code (e.g., respective one of error codes 144) of the selected error flag (e.g., respective one of error flags 142), the developer 104a deploys the solution 168. In response to determining that the solution 168 does not solve the issue (e.g., respective one of issues 140) corresponding to the error code (e.g., respective one of error codes 144) of the selected error flag (e.g., respective one of error flags 142), the developer 104a edits the solution 168 to obtain the edited solution 170. The developer 104a then tests the edited solution 170. The developer 104a determines if the edited solution 170 solves the issue (e.g., respective one of issues 140) corresponding to the error code (e.g., respective one of error codes 144) of the selected error flag (e.g., respective one of error flags 142). In response to determining that the edited solution 170 solves the issue (e.g., respective one of issues 140) corresponding to the error code (e.g., respective one of error codes 144) of the selected error flag (e.g., respective one of error flags 142), the developer 104a deploys the edited solution 170. The developer 104a sends an instruction 182 to the metaverse server 146 that instructs the metaverse server 146 to send the edited solution 170 to the monitoring/debugging system 124. The monitoring/debugging system 124 saves the edited solutions 170 along with the corresponding error code 144 in the knowledge database 134.

In response to determining that the error code (e.g., respective one of error codes 144) of the selected error flag (e.g., respective one of error flags 142) does not match an error code (e.g., respective one or error codes 136-1 through 136-n) stored in the knowledge database 134 or the edited solution 170 does not solve the issue (e.g., respective one of issues 140) corresponding to the error code (e.g., respective one of error codes 144) of the selected error flag (e.g., respective one of error flags 142), the developer 104a sends requests 180 to one or more developers (e.g., developers 104b and 104c) to join the metaverse session 156. The developer 104a determines a new solution 172 in collaboration with the one or more developers (e.g., developers 104b and 104c) and deploys the new solution 172. The developer 104a sends an instruction 182 to the metaverse server 146 that instructs the metaverse server 146 to send the new solution 172 to the monitoring/debugging system 124. The monitoring/debugging system 124 saves the new solution 172 along with corresponding error code 144 in the knowledge database 134. The above process is repeated for the rest of the error flags 142 and the corresponding error codes 144.

System Components

Network

Network 102 may be any suitable type of wireless and/or wired network. The network 102 may or may not be connected to the Internet or public network. The network 102 may include all or a portion of an Intranet, a peer-to-peer network, a switched telephone network, a local area network (LAN), a wide area network (WAN), a metropolitan area network (MAN), a personal area network (PAN), a wireless PAN (WPAN), an overlay network, a software-defined network (SDN), a virtual private network (VPN), a mobile telephone network (e.g., cellular networks, such as 4G or 5G), a plain old telephone (POT) network, a wireless data network (e.g., WiFi, WiGig, WiMax, etc.), a long-term evolution (LTE) network, a universal mobile telecommunications system (UMTS) network, a peer-to-peer (P2P) network, a Bluetooth network, a near field communication (NFC) network, and/or any other suitable network. The network 102 may be configured to support any suitable type of communication protocol as would be appreciated by one of ordinary skill in the art.

In certain embodiments, the network 102 may comprise a private network 102a that allows private communication between the user devices 106a through 106c of the developers 104a through 104c. The private network 102a may include 5G, 6G, and/or edge networks. The communication between the user devices 106a through 106c via the private network 102a may be encrypted.

User Devices

Each of the user devices 106a through 106d is generally any device that is configured to process data and interact with the user 104a and the developers 104b through 104d, respectively. Examples of a user device include, but are not limited to, a personal computer, a desktop computer, a workstation, a server, a laptop, a tablet computer, a mobile phone (such as a smartphone), a virtual reality (VR) headset, etc. Each of the user devices 106a through 106d may include a display 112, a microphone 114, a speaker 116, sensors 118, and/or a keypad. In one embodiment, the user devices 106a through 106d are VR devices comprising VR headsets and controllers. The sensors 118 may comprise eye tracking sensors, haptic sensors, and/or motion sensors.

The user device 106a may comprise a processor 108 in signal communication with a memory 120 and a network interface 110. The processor 108 comprises one or more processors operably coupled to the memory 120. The processor 108 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 108 may be a programmable logic device, a microcontroller, a microprocessor, or any suitable combination of the preceding. The one or more processors are configured to process data and may be implemented in hardware or software. For example, each of the processor 108 may be 8-bit, 16-bit, 32-bit, 64-bit, or of any other suitable architecture. The one or more processors are configured to implement various software instructions to perform the operations described herein. For example, the one or more processors are configured to execute software instructions 122 and perform one or more functions described herein.

The network interface 110 is configured to enable wired and/or wireless communications (e.g., via network 102). The network interface 110 is configured to communicate data between the user device 106a and other components of the system 100. For example, the network interface 110 may comprise a WIFI interface, a local area network (LAN) interface, a wide area network (WAN) interface, a modem, a switch, or a router. The processor 108 is configured to send and receive data using the network interface 110. The network interface 110 may be configured to use any suitable type of communication protocol as would be appreciated by one of ordinary skill in the art.

The memory 120 may be volatile or non-volatile and may comprise a read-only memory (ROM), random-access memory (RAM), ternary content-addressable memory (TCAM), dynamic random-access memory (DRAM), and static random-access memory (SRAM). The memory 120 may be implemented using one or more disks, tape drives, solid-state drives, and/or the like. The memory 120 may store any of the information described in FIGS. 1, 2, 3A, and 3B along with any other data, instructions, logic, rules, or code operable to implement the function(s) described herein when executed by the processor 108. The memory 120 is operable to store the software instructions 122, and/or any other data and instructions. The software instructions 122 may comprise any suitable set of software instructions, logic, rules, or code operable to be executed by the processor 108. The user devices 106b through 106d may be similar to the user device 106a and the description is not repeated herein.

In operation, the user devices 106a through 106c send various requests (e.g., requests 180) and instructions (e.g., instructions 182, 186, and 188), and receive various notifications (e.g., notification 184). The user devices 106a through 106c allow developers 104a through 104c access to metaverse sessions (e.g., metaverse session 156) hosted by the metaverse server 146.

Metaverse Server

The metaverse server 146 is generally any device that is configured to process data and communicate with other components of the system 100 via the network 102. The metaverse server 146 may comprise a processor 148 in signal communication with a memory 152 and a network interface 150.

Processor 148 comprises one or more processors operably coupled to the memory 152. The processor 148 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 148 may be a programmable logic device, a microcontroller, a microprocessor, or any suitable combination of the preceding. The one or more processors are configured to process data and may be implemented in hardware or software. For example, the processor 148 may be 8-bit, 16-bit, 32-bit, 64-bit, or of any other suitable architecture. The one or more processors are configured to implement various software instructions to perform the operations described herein. For example, the one or more processors are configured to execute software instructions 154 and perform one or more functions described herein.

Network interface 150 is configured to enable wired and/or wireless communications (e.g., via network 102). The network interface 150 is configured to communicate data between the metaverse server 146 and other components of the system 100. For example, the network interface 150 may comprise a WIFI interface, a local area network (LAN) interface, a wide area network (WAN) interface, a modem, a switch, or a router. The processor 148 is configured to send and receive data using the network interface 150. The network interface 150 may be configured to use any suitable type of communication protocol as would be appreciated by one of ordinary skill in the art.

Memory 152 may be volatile or non-volatile and may comprise a read-only memory (ROM), random-access memory (RAM), ternary content-addressable memory (TCAM), dynamic random-access memory (DRAM), and static random-access memory (SRAM). Memory 152 may be implemented using one or more disks, tape drives, solid-state drives, and/or the like. The memory 152 may store any of the information described in FIGS. 1, 2, 3A, and 3B along with any other data, instructions, logic, rules, or code operable to implement the function(s) described herein. The memory 152 is operable to store software instructions 154, and/or any other data and instructions. The software instructions 154 may comprise any suitable set of software instructions, logic, rules, or code operable to be executed by the processor 148. The metaverse server 146 may host one or more metaverse sessions (e.g., metaverse session 156), which may be stored in the memory 152.

In operation, the metaverse server 146 is configured to allow the user 104d and the developers 104a through 104c access to the one or more metaverse sessions (e.g., metaverse session 156). The metaverse server 146 may be further configured to display error flags 142 within a field of view 162 of a developer avatar 160 of the developer 104a. Each error flag 142 comprises a respective error code 144. The error codes 144 may refer to object rendering failures, haptic response failures, content upload failures, login failures, or the like.

Figure 2:
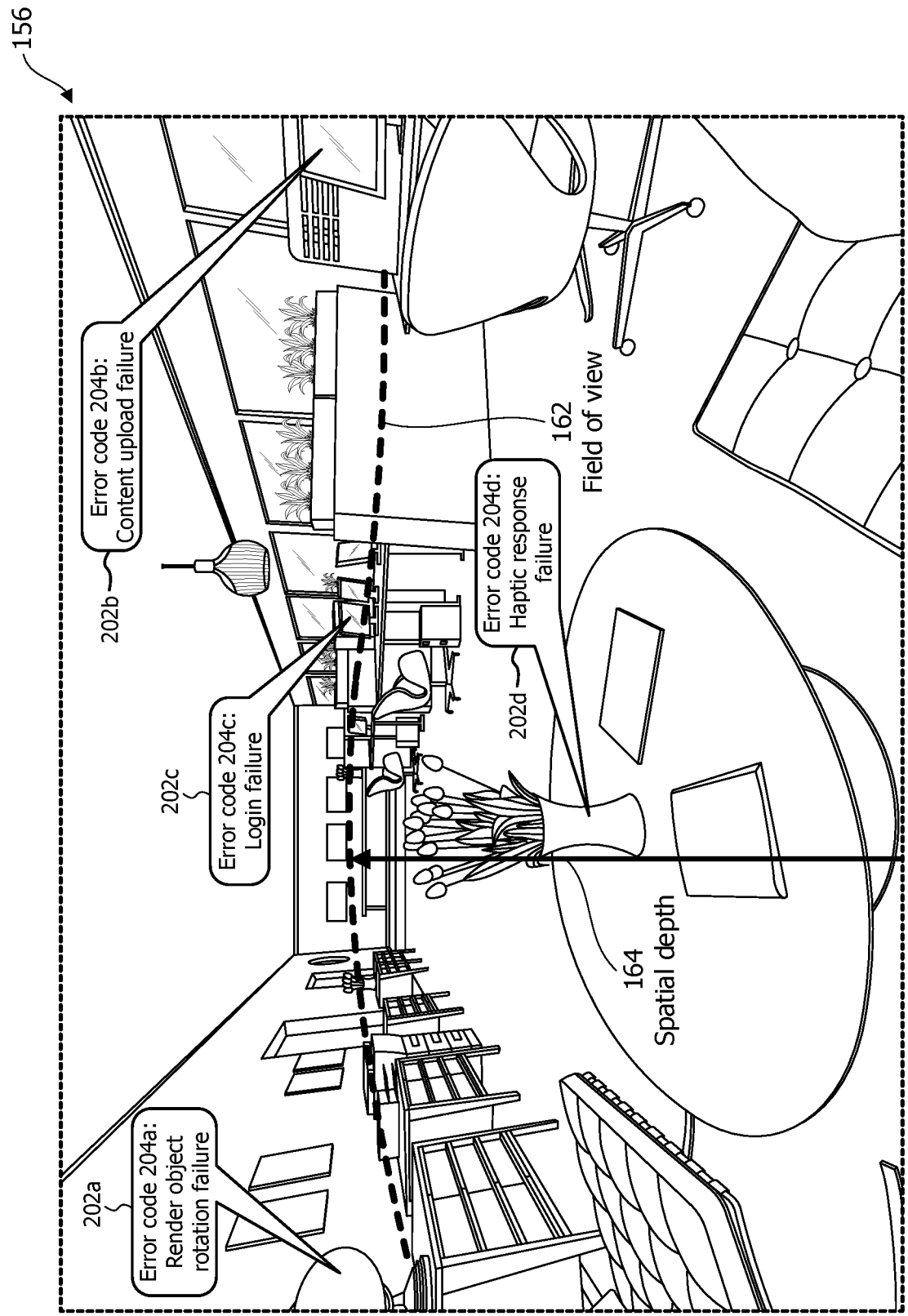
FIG. 2 illustrates a rendering of an exemplary metaverse session.

FIG. 2 illustrates a rendering of an exemplary embodiment of the metaverse session 156. In the illustrated embodiments, the monitoring/debugging system 124 generates error flags 202a through 202d within the field of view 162. The field of view 162 has a spatial depth 164. The error flag 202a comprises an error code 204a, which corresponds to an object rotating rendering failure. The error flag 202b comprises an error code 204b, which corresponds to a content upload failure. The error flag 202c comprises an error code 204c, which corresponds to a login failure. The error flag 202d comprises an error code 204d, which corresponds to a haptic response failure.

Monitoring/Debugging System

The monitoring/debugging system 124 is generally any device that is configured to process data and communicate with other components of the system 100 via the network 102. The monitoring/debugging system 124 may comprise a processor 126 in signal communication with a memory 130 and a network interface 128.

Processor 126 comprises one or more processors operably coupled to the memory 130. The processor 126 is any electronic circuitry, including, but not limited to, state machines, one or more central processing unit (CPU) chips, logic units, cores (e.g., a multi-core processor), field-programmable gate array (FPGAs), application-specific integrated circuits (ASICs), or digital signal processors (DSPs). The processor 126 may be a programmable logic device, a microcontroller, a microprocessor, or any suitable combination of the preceding. The one or more processors are configured to process data and may be implemented in hardware or software. For example, the processor 126 may be 8-bit, 16-bit, 32-bit, 64-bit, or of any other suitable architecture. The one or more processors are configured to implement various software instructions to perform the operations described herein. For example, the one or more processors are configured to execute software instructions 132 and perform one or more functions described herein.

Network interface 128 is configured to enable wired and/or wireless communications (e.g., via network 102). The network interface 128 is configured to communicate data between the monitoring/debugging system 124 and other components of the system 100. For example, the network interface 128 may comprise a WIFI interface, a local area network (LAN) interface, a wide area network (WAN) interface, a modem, a switch, or a router. The processor 126 is configured to send and receive data using the network interface 128. The network interface 128 may be configured to use any suitable type of communication protocol as would be appreciated by one of ordinary skill in the art.

Memory 130 may be volatile or non-volatile and may comprise a read-only memory (ROM), random-access memory (RAM), ternary content-addressable memory (TCAM), dynamic random-access memory (DRAM), and static random-access memory (SRAM). Memory 130 may be implemented using one or more disks, tape drives, solid-state drives, and/or the like. The memory 130 may store any of the information described in FIGS. 1, 2, 3A, and 3B along with any other data, instructions, logic, rules, or code operable to implement the function(s) described herein. The memory 130 is operable to store software instructions 132, and/or any other data and instructions. The software instructions 132 may comprise any suitable set of software instructions, logic, rules, or code operable to be executed by the processor 126.

The memory 130 may further store a knowledge database 134. The knowledge database 134 may comprise error codes 136-1 through 136-n and corresponding solutions 138-1 through 138-n. The error codes 136-1 through 136-n may refer to object rendering failures, haptic response failures, content upload failures, login failures, and/or the like.

In operation, the monitoring/debugging system 124 monitors the metaverse session 156 and sends a notification 174 to the developer 104a that the user 104d is facing one or more issues 140 while interacting with the metaverse session 156. The monitoring/debugging system 124 generates one or more error flags 142 in the metaverse session 156 within the field of view 162 of the developer avatar 160 based on the one or more issues 140. Each error flag 142 comprises a respective error code 144. The developer 104a requests a solution 168 for an error code (e.g., respective one of error codes 144) of the selected error flag (e.g., respective one of error flags 142) from the monitoring/debugging system 124. The monitoring/debugging system 124 determines if the error code (e.g., respective one of error codes 144) of the selected error flag (e.g., respective one of error flags 142) matches with an error code (e.g., respective one of error codes 136-1 through 136-n) stored in the knowledge database 134. In response to determining that the error code (e.g., respective one of error codes 144) of the selected error flag (e.g., respective one of error flags 142) matches with the error code (e.g., respective one of error codes 136-1 through 136-n) stored in the knowledge database 134, the monitoring/debugging system 124 determines the solution 168. The monitoring/debugging system 124 is further configured to save solutions (e.g., solutions 170 and 172) generated by the developers 104a through 104c with corresponding error codes 144 in the knowledge database 134.

Example Method for Metaverse Debugging

Figure 3A:
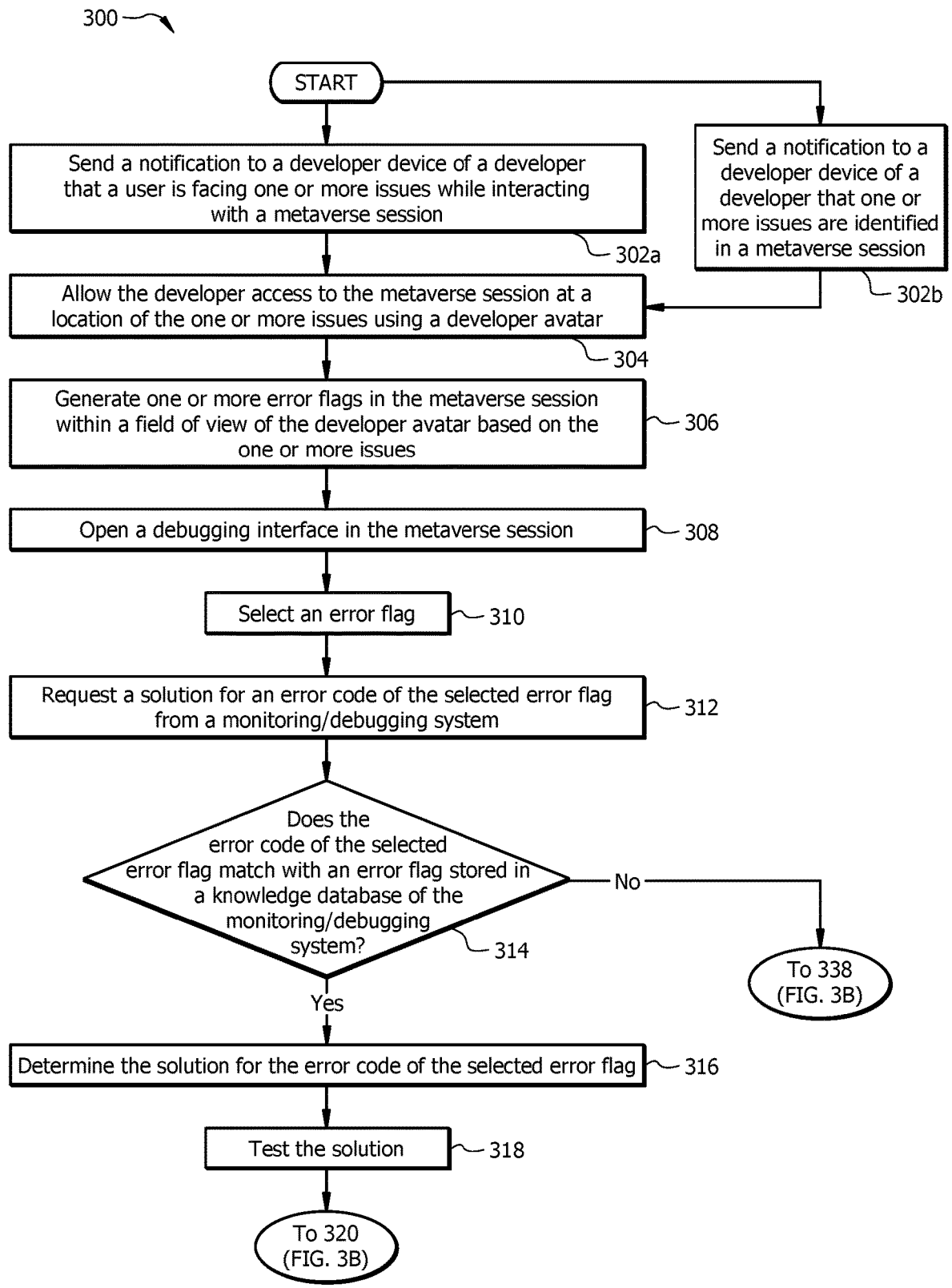
FIGS. 3A and 3B illustrate an example operational flow of system of FIG. 1 for metaverse debugging.
Figure 3B:
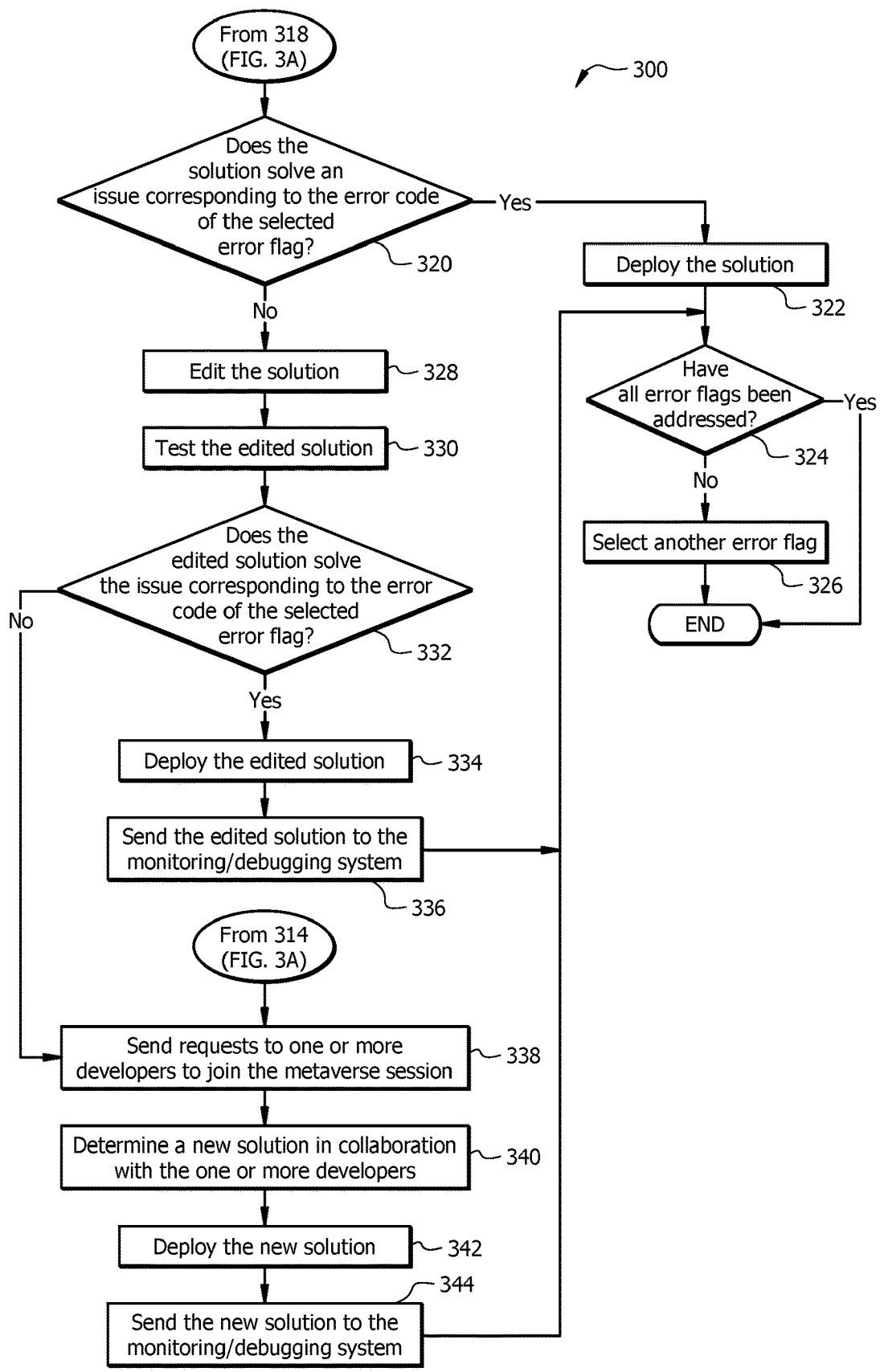

FIGS. 3A and 3B illustrate an example flowchart of a method 300 for metaverse debugging. Modifications, additions, or omissions may be made to method 300. Method 300 may include more, fewer, or other operations. For example, operations may be performed in parallel or in any suitable order. For example, one or more operations of method 300 may be implemented, at least in part, in the form of the software instructions (e.g., instructions 122, 132, and/or 154 of FIG. 1), stored on non-transitory, tangible, machine-readable medium (e.g., memories 120, 130, and/or 152 of FIG. 1) that when executed by one or more processors (e.g., processors 108, 126, and/or 148 of FIG. 1) may cause the one or more processors to perform operations 302a, 302b, and 304-344.

Method 300 starts by performing either operation 302a or 302b. At operation 302a, a monitoring/debugging system 124 sends a notification 174 to a developer device 106a of a developer 104a that a user 104d is facing one or more issues 140 while interacting with a metaverse session 156 hosted by a metaverse server 146.

At operation 302b, a processor 148 of the monitoring/debugging system 124 sends a notification 174 to the developer device 106a of a developer 104a that one or more issues 140 are identified in the metaverse session 156 hosted by the metaverse server 146.

At operation 304, the processor 148 of the metaverse server 146 allows the developer 104a access to the metaverse session 156 at a location of the one or more issues 140 using a developer avatar 160 of the developer 104a.

At operation 306, a processor 126 of the monitoring/debugging system 124 generates one or more error flags 142 in the metaverse session 156 within a field of view 162 of the developer avatar 160 based on the one or more issues 140. In certain embodiments, the field of view 162 has a spatial depth 164. The spatial depth 164 may be altered by the developer 104a. Each error flag 142 comprises a respective error code 144.

At operation 308, the developer 104a opens a debugging interface 166 in the metaverse session 156. In certain embodiments, a processor 108 of the developer device 106a of the developer 104a sends an instruction 182 to the metaverse server 146 to open the debugging interface 166 in the metaverse session 156.

At operation 310, the developer 104a selects an error flag of the one or more error flags 142.

At operation 312, the developer 104a requests a solution 168 for an error code (e.g., respective one of error codes 144 of FIG. 1) of the selected error flag (e.g., respective one of error flags 142 of FIG. 1) from the monitoring/debugging system 124. In certain embodiments, the processor 108 of the developer device 106a of the developer 104a sends an instruction 182 to the metaverse server 146. In response to receiving instruction 182, the processor 148 of the metaverse server 146 sends a request 176 to the monitoring/debugging system 124 for the solution 168. The request 176 comprises information about the error code (e.g., respective one of error codes 144 of FIG. 1) of the selected error flag (e.g., respective one of error flags 142 of FIG. 1).

At operation 314, the processor 126 of the monitoring/debugging system 124 compares the error code (e.g., respective one of error codes 144 of FIG. 1) of the selected error flag (e.g., respective one of error flags 142 of FIG. 1) to error codes 136-1 through 136-n stored in a knowledge database 134 of the monitoring/debugging system 124 and determines if the error code (e.g., respective one of error codes 144 of FIG. 1) of the selected error flag (e.g., respective one of error flags 142 of FIG. 1) matches an error code (e.g., respective one or error codes 136-1 through 136-n of FIG. 1) stored in the knowledge database 134.

In response to determining at operation 314 that the error code (e.g., respective one of error codes 144 of FIG. 1) of the selected error flag (e.g., respective one of error flags 142 of FIG. 1) matches the error code (e.g., respective one or error codes 136-1 through 136-n of FIG. 1) stored in the knowledge database 134, method 300 continues to operation 316. At operation 316, the processor 126 of the monitoring/debugging system 124 determines the solution 168 for the error code (e.g., respective one of error codes 144 of FIG. 1) of the selected error flag (e.g., respective one of error flags 142 of FIG. 1). In certain embodiments, the processor 126 of the monitoring/debugging system 124 determines the solution 168 to be a solution among the solutions 138-1 through 138-n that corresponds to the error code (e.g., respective one or error codes 136-1 through 136-n of FIG. 1) stored in the knowledge database 134.

At operation 318, the developer 104a tests the solution 168. In certain embodiments, the processor 108 of the developer device 106a of the developer 104a sends an instruction 182 to the metaverse server 124 to test the solution 168.

At operation 320, the developer 104a determines if the solution 168 solves an issue (e.g., respective one of issues 140 of FIG. 1) corresponding to the error code (e.g., respective one of error codes 144 of FIG. 1) of the selected error flag (e.g., respective one of error flags 142 of FIG. 1). In certain embodiments, the processor 148 of the metaverse server 146 tests the solution 168 and sends a notification 184 to the developer device 106a of the developer 104a. The notification 184 may indicate that the test passed or failed. In response to determining that the notification 184 indicates that test passed, the developer 104a determines that the solution 168 solves the issue (e.g., respective one of issues 140 of FIG. 1) corresponding to the error code (e.g., respective one of error codes 144 of FIG. 1) of the selected error flag (e.g., respective one of error flags 142 of FIG. 1). In response to determining that the notification 184 indicates that the test failed, the developer 104a determines that the solution 168 does not solve the issue (e.g., respective one of issues 140 of FIG. 1) corresponding to the error code (e.g., respective one of error codes 144 of FIG. 1) of the selected error flag (e.g., respective one of error flags 142 of FIG. 1).

In response to determining at operation 320 that the solution 168 solves the issue (e.g., respective one of issues 140 of FIG. 1) corresponding to the error code (e.g., respective one of error codes 144 of FIG. 1) of the selected error flag (e.g., respective one of error flags 142 of FIG. 1), method 300 continues to operation 322. At operation 322, the developer 104a deploys the solution 168. In certain embodiments, the processor 108 of the developer device 106a of the developer 104a sends an instruction 182 to the metaverse server 146 to deploy the solution 168. In response to receiving the instruction 182, the processor 148 of the metaverse server 146 deploys the solution 168.

At operation 324, the developer 104a determines if all of the error flags 142 have been addressed. In response to determining at operation 324 that all of the error flags 142 have been addressed, method 300 ends.

In response to determining at operation 324 that not all of the error flags 142 have been addressed, method 300 continues to operation 326. At operation 326, the developer 140a selects another error flag of the error flags 142. After performing operation 326, method 300 continues back to operation 312.

In response to determining at operation 320 that the solution 168 does not solve the issue (e.g., respective one of issues 140 of FIG. 1) corresponding to the error code (e.g., respective one of error codes 144 of FIG. 1) of the selected error flag (e.g., respective one of error flags 142 of FIG. 1), method 300 continues to operation 328.

At operation 328, the developer 104a edits the solution 168 to obtain the edited solution 170. In certain embodiments, the processor 108 of the developer device 106a of the developer 104a sends one or more instructions 182 to the metaverse server 146. In response to receiving the instructions 182, the processor 148 of the metaverse server 146 applies the instructions 182 to the solution 168 to generate the edited solution 170.

At operation 330, the developer 104a tests the edited solution 170. In certain embodiments, the processor 108 of the developer device 106a of the developer 104a sends an instruction 182 to the metaverse server 124 to test the edited solution 170.

At operation 332, the developer 104a determines if the edited solution 170 solves the issue (e.g., respective one of issues 140 of FIG. 1) corresponding to the error code (e.g., respective one of error codes 144 of FIG. 1) of the selected error flag (e.g., respective one of error flags 142 of FIG. 1). In certain embodiments, the processor 148 of the metaverse server 146 tests the edited solution 170 and sends a notification 184 to the developer device 106a of the developer 104a. The notification 184 may indicate that the test passed or failed. In response to determining that the notification 184 indicates that the test passed, the developer 104a determines that the edited solution 170 solves the issue (e.g., respective one of issues 140 of FIG. 1) corresponding to the error code (e.g., respective one of error codes 144 of FIG. 1) of the selected error flag (e.g., respective one of error flags 142 of FIG. 1). In response to determining that the notification 184 indicates that the test failed, the developer 104a determines that the edited solution 170 does not solve the issue (e.g., respective one of issues 140 of FIG. 1) corresponding to the error code (e.g., respective one of error codes 144 of FIG. 1) of the selected error flag (e.g., respective one of error flags 142 of FIG. 1).

In response to determining at operation 332 that the edited solution 170 solves the issue (e.g., respective one of issues 140 of FIG. 1) corresponding to the error code (e.g., respective one of error codes 144 of FIG. 1) of the selected error flag (e.g., respective one of error flags 142 of FIG. 1), method 300 continues to operation 334. At operation 334, the developer 104a deploys the edited solution 170. In certain embodiments, the processor 108 of the developer device 106a of the developer 104a sends an instruction 182 to the metaverse server 146 to deploy the edited solution 170. In response to receiving the instruction 182, the processor 148 of the metaverse server 146 deploys the edited solution 170.

At operation 336, the processor 108 of the developer device 106a of the developer 104a sends an instruction 182 to the metaverse server 146 that instructs the metaverse server 146 to send the edited solution 170 to the monitoring/debugging system 124. In response to receiving the instruction 182, the metaverse server 146 to send the edited solutions 170 to the monitoring/debugging system 124. The processor 126 of the monitoring/debugging system 124 saves the edited solution 170 along with corresponding error code 144 in the knowledge database 134.

After performing operation 336, method 300 continues to operation 324. At operation 324, the developer 104a determines if all of the error flags 142 have been addressed. In response to determining at operation 324 that all of the error flags 142 have been addressed, method 300 ends.

In response to determining at operation 324 that not all of the error flags 142 have been addressed, method 300 continues to operation 326. At operation 326, the developer 140a selects another error flag of the error flags 142. After performing operation 326, method continues back to operation 312.

In response to determining at operation 314 that the error code (e.g., respective one of error codes 144 of FIG. 1) of the selected error flag (e.g., respective one of error flags 142 of FIG. 1) does not match an error code (e.g., respective one or error codes 136-1 through 136-n of FIG. 1) stored in the knowledge database 134 or determining at operation 332 that the edited solution 170 does not solve the issue (e.g., respective one of issues 140 of FIG. 1) corresponding to the error code (e.g., respective one of error codes 144 of FIG. 1) of the selected error flag (e.g., respective one of error flags 142 of FIG. 1), method 300 continues to operation 338.

At operation 338, the developer device 106a of the developer 104a sends requests 180 to one or more developers (e.g., developers 104b and 104c of FIG. 1) to join the metaverse session 156.

At operation 340, the developer 104a determines a new solution 172 in collaboration with the one or more developers (e.g., developers 104b and 104c of FIG. 1). In certain embodiments, the processors 108 of the developer devices 106a, 106b, and 106c of the developers 104a, 104b, and 104c send instructions 182, 186, and 188 to the metaverse server 146. The instructions 182, 186, and 188 instruct the processor 148 of the metaverse server 146 to generate the new solution 172.

At operation 342, the developer 104a deploys the new solution 172. In certain embodiments, the processor 108 of the developer device 106a of the developer 104a sends an instruction 182 to the metaverse server 146 to deploy the new solution 172. In response to receiving the instruction 182, the processor 148 of the metaverse server 146 deploys the new solution 172.

At operation 344, the processor 108 of the developer device 106a of the developer 104a sends an instruction 182 to the metaverse server 146 that instructs the metaverse server 146 to send the new solution 172 to the monitoring/debugging system 124. In response to receiving the instruction 182, the processor 148 of the metaverse server 146 sends the new solution 172 to the monitoring/debugging system 124. The processor 126 of the monitoring/debugging system 124 saves the new solution 172 along with the corresponding error code 144 in the knowledge database 134.

After performing operation 344, method 300 continues to operation 324. At operation 324, the developer 104a determines if all of the error flags 142 have been addressed. In response to determining at operation 324 that all of the error flags 142 have been addressed, method 300 ends.

In response to determining at operation 324 that not all of the error flags 142 have been addressed, method 300 continues to operation 326. At operation 326, the developer 140a selects another error flag of the error flags 142. After performing operation 326, method continues back to operation 312.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A method comprising:
   allowing a user access to a metaverse session using a user avatar;
   monitoring an interaction of the user with the metaverse session;
   sending a notification to a first developer that the user is facing an issue while interacting with the metaverse session;
   allowing the first developer access to the metaverse session at a location of the issue using a first developer avatar;
   generating one or more error flags within a field of view of the first developer avatar in the metaverse session, each error flag comprising a respective error code;
   comparing a first error code of a first error flag to a plurality of stored error codes stored in a knowledge database, wherein the knowledge database further stores a plurality of stored solutions corresponding to the plurality of stored error codes; and
   in response to determining that the first error code matches a first stored error code:
      determining a first solution, wherein the first solution comprises a first stored solution corresponding to the first stored error code; and
      in response to determining that the first solution solves the issue of the user:
         deploying the first solution to the metaverse session.

2. The method of claim 1, further comprising:
   in response to determining that the first solution does not solve the issue of the user:
      allowing the first developer to edit the first solution and to determine an edited first solution; and
      in response to determining that the edited first solution solves the issue of the user:
         deploying the edited first solution to the metaverse session.

3. The method of claim 2, further comprising:
   storing the edited first solution in the knowledge database.

4. The method of claim 2, further comprising:
   in response to determining that the edited first solution does not solve the issue of the user or in response to determining that the first error code does not match the plurality of stored error codes:
      sending requests to one or more additional developers to join the metaverse session;
      determining a second solution in collaboration with the one or more additional developers; and
      deploying the second solution to the metaverse session.

5. The method of claim 4, further comprising:
   storing the second solution in the knowledge database.

6. The method of claim 4, wherein a developer device of the first developer and developer devices of the one or more additional developers communicate with each other via a private network.

7. The method of claim 1, further comprising:
   opening a debugging interface within the metaverse session.

8. A non-transitory computer-readable medium storing instructions that, when executed by one or more processors, cause the one or more processors to:
   allow a user access to a metaverse session using a user avatar;
   monitor an interaction of the user with the metaverse session;
   send a notification to a first developer that the user is facing an issue while interacting with the metaverse session;
   allow the first developer access to the metaverse session at a location of the issue using a first developer avatar;
   generate one or more error flags within a field of view of the first developer avatar in the metaverse session, each error flag comprising a respective error code;
   compare a first error code of a first error flag to a plurality of stored error codes stored in a knowledge database, wherein the knowledge database further stores a plurality of stored solutions corresponding to the plurality of stored error codes; and
   in response to determining that the first error code matches a first stored error code:
      determine a first solution, wherein the first solution comprises a first stored solution corresponding to the first stored error code; and
      in response to determining that the first solution solves the issue of the user:
         deploy the first solution to the metaverse session.

9. The non-transitory computer-readable medium of claim 8, wherein the instructions, when executed by the one or more processors, further cause the one or more processors to:
   in response to determining that the first solution does not solve the issue of the user:
      allowing the first developer to edit the first solution and to determine an edited first solution; and
      in response to determining that the edited first solution solves the issue of the user:
         deploying the edited first solution to the metaverse session.

10. The non-transitory computer-readable medium of claim 9, wherein the instructions, when executed by the one or more processors, further cause the one or more processors to:
    storing the edited first solution in the knowledge database.

11. The non-transitory computer-readable medium of claim 9, wherein the instructions, when executed by the one or more processors, further cause the one or more processors to:
    in response to determining that the edited first solution does not solve the issue of the user or in response to determining that the first error code does not match the plurality of stored error codes:
       send requests to one or more additional developers to join the metaverse session;

determine a second solution in collaboration with the one or more additional developers; and deploy the second solution to the metaverse session.

12. The non-transitory computer-readable medium of claim 11, wherein the instructions, when executed by the one or more processors, further cause the one or more processors to:

store the second solution in the knowledge database.

13. The non-transitory computer-readable medium of claim 11, wherein a developer device of the first developer and developer devices of the one or more additional developers communicate with each other via a private network.

14. A system comprising:

a metaverse server comprising:
   a first processor configured to:
     allow a user access to a metaverse session using a user avatar, wherein the user faces an issue while interacting with the metaverse session; and
     allow a first developer access to the metaverse session at a location of the issue using a first developer avatar; and a monitoring/debugging system communicatively coupled to the metaverse server, wherein the monitoring/debugging system comprises:
   a memory configured to store:
     a plurality of stored error codes; and
     a plurality of stored solutions corresponding to the plurality of stored error codes; and
   a second processor communicatively coupled to the memory, wherein the second processor is configured to:
     monitor an interaction of the user with the metaverse session;
     send a notification to the first developer that the user is facing the issue while interacting with the metaverse session;
     generate one or more error flags within a field of view of the first developer avatar in the metaverse session, each error flag comprising a respective error code;
     compare a first error code of a first error flag to the plurality of stored error codes;
     in response to determining that the first error code matches a first stored error code:
       determine a first solution, wherein the first solution comprises a first stored solution corresponding to the first stored error code; and
     in response to determining that the first solution solves the issue of the user:
       deploy the first solution to the metaverse session.

15. The system of claim 14, wherein the first processor is further configured to:

in response to determining that the first solution does not solve the issue of the user:
   allows the first developer to edit the first solution and to determine an edited first solution; and
in response to determining that the edited first solution solves the issue of the user:
   deploy the edited first solution to the metaverse session.

16. The system of claim 15, wherein the first processor is further configured to:

store the edited first solution in the memory of the monitoring/debugging system.

17. The system of claim 15, further comprising a first developer device of the first developer communicatively coupled to the metaverse server and the monitoring/debugging system, wherein the first developer device comprises:

a third processor configured to:
   in response to determining that the edited first solution does not solve the issue of the user or in response to determining that the first error code does not match the plurality of stored error codes:
   send requests to one or more additional developers to join the metaverse session;
   determine a second solution in collaboration with the one or more additional developers; and
   deploy the second solution to the metaverse session.

18. The system of claim 17, wherein the first processor is further configured to:

store the second solution in the memory of the monitoring/debugging system.

19. The system of claim 17, wherein the first developer device of the first developer and developer devices of the one or more additional developers communicate with each other via a private network.

20. The system of claim 14, wherein the first processor is further configured to:

open a debugging interface within the metaverse session.

* * * * *